3,515,678
SELECTIVE HYDROGENATION OF SOYBEAN OIL
WITH SUPPORTED COPPER CATALYSTS
Sambasivarao Koritala, Peoria, Ill., assignor to the United
States of America as represented by the Secretary of
Agriculture
No Drawing. Filed Aug. 10, 1967, Ser. No. 660,881
Int. Cl. B01j 11/82, 11/58
U.S. Cl. 252—432          2 Claims

ABSTRACT OF THE DISCLOSURE

Extremely active and selective hydrogenation catalysts that permit soybean oil to be sufficiently hydrogenated in about 11 minutes for subsequent winterizing to a stable salad oil comprise copper deposited either on micronized silica having a high content of surface hydroxyl groups or on molecular sieve zeolites having pore sizes of either 4 A or 10 A.

---

A nonexclusive, irrevocable, royalty-free license in the invention herein described, throughout the world for all purposes of the United States Government, with the power to grant sublicenses for such purposes, is hereby granted to the Government of the United States of America.

DETAILED DESCRIPTION OF THE INVENTION

This invention relates to certain novel supported copper selective hydrogenation catalysts that when used in the partial hydrogenation of refined, bleached soybean oil in amounts equivalent to about 0.1 percent of the oil exhibit linolenic/linoleic selectivity values $$K = \frac{k_{Le}}{k_{Lo}}$$

of about 15–16.5 whereby there are efficiently produced in merely a matter of minutes stable soybean oils that retain only a fraction of their original content of unstable linolenic acid while retaining a practically undiminished content of nutritionally essential linoleic acid, all without wastefully increasing the original content of saturated fatty acid which is subsequently removed by winterizing the oil to make it refrigeratable without haze formation, the fatty acid constituents of the hydrogenated oil prior to winterization constituting respectively, 0.4-percent linolenic acid, 48-percent linoleic acid, 35-percent oleic acid, and 4-percent stearic acid.

Extensive research as to the causes of soybean salad oil storage instability and flavor reversion has authoritatively implicated the oxidation susceptibility of the linolenic acid constituent of the oil as the principal cause. Consequently, during the past few years many groups have sought preferentially selective hydrogenation catalysts that are faster acting, i.e., more active, and that are more selective, i.e., that will induce a practically quantitative partial hydrogenation of the triene unsaturation mainly to diene unsaturation with only little concurrent effect on the dominant diene unsaturation while effecting very little, if any, hydrogenation of the mono-unsaturation, thereby preserving the nutritionally advantageous linoleic acid without increasing the content of eventually byproduct stearic acid.

The use of various extremely active but almost wholly nonselective nickel preparations as hydrogenation catalysts is very old in the art. These catalysts, typified by Raney nickel, are useless for selectively hydrogenating soybean oil to a stable salad or table oil having a sharply lowered content or reactive linolenic acid and a relatively undiminished content of linoleic acid.

Kuwata et al., U.S. Pat. No. 3,169,981, teaches the selective hydrogenation of refined soybean oil originally containing 7.5 percent linolenic acid to a triene content of about 3 percent in 7 minutes at 200° C. using as the catalyst 0.1–0.2 percent of a Cu—Cr—MnO preparation.

De Jonge et al., U.S. Pat. No. 3,278,568, teaches the improvement of soybean oil for dietary purposes by partial hydrogenation in the presence of elemental copper, copper alloys, or organometallic copper complexes dispersed on a variety of carriers including activated clay, diatomaceous earth, and silica gel, but the sole exemplified hydrogenation time of 50 minutes clearly shows that while certain of their catalysts exhibit high selectivities for linolenic acid, these catalysts have relatively poor activities, which, of course, seriously limit the number of batches per day that can be converted.

Thus, the object of the present invention is the provision of improved hydrogenation catalysts that exhibit exceptionally high linolenate/linoleate selectivity, i.e., values coupled with very great activities whereby extremely brief hydrogenations provide stable oils that need only to be winterized to provide esthetically satisfactory salad oils.

Example 1

To 50 ml. of an aqueous solution containing 1 gram of copper nitrate was added 2.5 grams of "M5 Cab-O-Sil," Cabot Corporation's registered name for a pyrolyzed silica having an average particle size of 12 m$\mu$, a surface area of 200 sq. m./g., and a surface hydroxyl group content of about 1.5 meq./g., such silica being disclosed in Example 3 of U.S. Pat. No. 3,288,725. To the vigorously stirred suspension was then slowly added a stoichiometric amount (439 mg.) of sodium carbonate dissolved in 10 ml. water. The precipitate was separated, washed with distilled water, dried, ground to a fine powder, and heated at 350° C. for 2 hours before use.

A commercially supplied batch of refined and bleached soybean oil analyzing 8.2 percent linolenic acid and having a free fatty acid content of 0.04 percent was re-refined by the addition of sufficient 10% NaOH to neutralize the free fatty acids, followed by vacuum filtration removal of the resulting soap, the residual fatty acid content then being less than 0.1%. Then the oil was heated at 110–115° C. under nitrogen and bleached with bleaching earth-activated carbon mixture for 15 minutes. After cooling and filtering the oil, 300 ml. thereof and 2.8 grams of the catalyst (0.1% CuO by volume of the oil) were placed in a suitably equipped hydrogenation reactor having a very high speed stirring means. While constantly stirring at 1700 r.p.m., the reactor was electrically heated to 170° C. and hydrogen gas was then admitted at a pressure of 30 p.s.i. for 11.5 minutes. The resulting oil had an iodine value of 119.8, a linolenic acid content of 0.4 percent, a linoleic acid content of 48.0 percent, an oleic acid content of 35 percent, and a stearic acid content of 4 percent. Thus, the catalyst has a selectivity (K ratio) of 16.0. When the copper was supported on the same type of silica with a particle size of 7 m$\mu$ and a surface area of 390 sq. m./g., a hydrogenation time of 18 minutes was required to obtain the same linolenic content, and the K value was 15.2. Under otherwise identical conditions, a 0.5-percent concentration of a commercial copper chromite catalyst required 36 minutes of hydrogenation to lower the linolenic acid to the same extent, and this was accompanied by the appreciably lower linoleic acid content corresponding to a K value of only 12. Although a nickel-on-kieselguhr catalyst, as expected, reduced the linolenic acid content of the oil to 0.4 percent in only 2–4 minutes, the corresponding linoleic acid, oleic acid, and stearic acid contents of 10 percent, 62 percent, and 15 percent, amply indicate the useless nonselectivity of the latter catalyst.

Example 2

About 3 grams of "13X Molecular Sieve" obtained from the Linde Division of Union Carbide Corporation, which product is a molecular sieve zeolite having a particle size of 2 to 5μ and a pore diameter of 10 A., was stirred in 30 ml. of an aqueous solution containing 2.0 grams copper nitrate. After precisely 60 minutes, the Cu-exchanged sieve material was recovered by filtration, washed thoroughly with distilled water, and dried at 100° C. Analysis showed the sieve to contain 9.4% Cu. The exchanged sieve was then suspended in 20 ml. water and 10 ml. of 5% sodium borohydride solution was stirred thereinto. The copper catalyst was isolated by filtration, washed, dried, and heated at 350° C. for 2 hours before use.

A 300 ml. portion of the identical SBO used in Example 1 was hydrogenated under precisely the same conditions excepting that the hydrogenation temperature was 200° C. instead of 170° C. and the catalyst concentration expressed as grams of copper oxide per 100 ml. oil was 0.13 percent instead of 0.1 percent. The hydrogenation time required with this catalyst for reaching a linolenate content of 0.4 percent was 13 minutes, by which time the original 134 iodine value of the unreduced oil had fallen to an IV of 1200. The K value of the catalyst was calculated as being 11.0.

I claim:
1. A supported copper oxide catalyst capable of accelerating the hydrogenation of soybean oil to about 11.5 minutes with the resultant production of a hydrogenated soybean oil having a linolenic/linoleic selectivity value of about 16.0, said catalyst having been prepared by mixing 50 ml. of an aqueous solution containing 1 gram of copper nitrate with 2.5 grams of a pyrolized silica having an average particle size of 12 mμ, a surface area of 200 sq. m./g., and a surface hydroxyl group content of about 1.5 meq./g. to form a suspension, vigorously stirring the suspension while mixing therewith a stoichiometric amount of sodium carbonate dissolved in 10 ml. water, thereby to precipitate copper oxide, separating the precipitate, washing it with distilled water, drying it, grinding it to a fine powder, and heating it at 350° for 2 hours prior to its use.

2. A supported copper oxide catalyst capable of accelerating the hydrogenation of soybean oil to about 13 minutes with the resultant production of a hydrogenated soybean oil having a linolenic/linoleic selectivity value of about 11.0, said catalyst having been prepared by mixing 30 ml. of an aqueous solution containing 2.0 grams of copper nitrate with about 3 grams of a molecular sieve zeolite having a particle size range of 2μ to 5μ and a pore diameter of 10 A., recovering the Cu-exchanged sieve material by filtration after 60 minutes, washing it with distilled water, drying it at 100° C., suspending it in 20 ml. of water, mixing the suspension with 10 ml. of 5% sodium borohydride with stirring, isolating the copper catalyst by filtration, washing it, drying it, and heating it at 350° C. for 2 hours prior to its use.

References Cited

UNITED STATES PATENTS

| | | | |
|---|---|---|---|
| 1,815,790 | 7/1931 | Mark et al. | 252—454 X |
| 3,013,985 | 12/1961 | Breck et al. | 252—455 |
| 3,278,568 | 10/1966 | de Jonge et al. | 252—454 X |
| 3,288,725 | 11/1966 | Aftandilian | 252—447 |

FOREIGN PATENTS 941,349  11/1963  Great Britain.

DANIEL E. WYMAN, Primary Examiner

C. F. DEES, Assistant Examiner

U.S. Cl. X.R.

252—454, 455